United States Patent
He et al.

(10) Patent No.: US 10,648,418 B2
(45) Date of Patent: May 12, 2020

(54) METHOD AND SYSTEM FOR CALCULATING ATKINSON CYCLE INTAKE FLOWRATE OF INTERNAL COMBUSTION ENGINE

(71) Applicant: GUANGZHOU AUTOMOBILE GROUP CO., LTD., Guangzhou, Guangdong (CN)

(72) Inventors: Yu He, Guangdong (CN); Xuetong Lian, Guangdong (CN); Sicong Lin, Guangdong (CN); Jujiang Liu, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 65 days.

(21) Appl. No.: 16/088,860

(22) PCT Filed: Mar. 30, 2017

(86) PCT No.: PCT/CN2017/078754
§ 371 (c)(1),
(2) Date: Sep. 27, 2018

(87) PCT Pub. No.: WO2017/167220
PCT Pub. Date: Oct. 5, 2017

(65) Prior Publication Data
US 2019/0112995 A1    Apr. 18, 2019

(30) Foreign Application Priority Data

Mar. 31, 2016    (CN) .......................... 2016 1 0195275

(51) Int. Cl.
*F02D 35/02*    (2006.01)
*F02D 41/18*    (2006.01)
(Continued)

(52) U.S. Cl.
CPC ....... *F02D 41/182* (2013.01); *F02D 13/0269* (2013.01); *F02D 35/023* (2013.01);
(Continued)

(58) Field of Classification Search
CPC .......... F02D 2041/001; F02D 13/0269; F02D 41/182; F02D 2200/0402;
(Continued)

(56) References Cited

U.S. PATENT DOCUMENTS

| 6,856,890 B2 * | 2/2005 | Muto ................... F02D 13/0261 123/347 |
| 7,025,041 B2 * | 4/2006 | Abe ....................... F02D 35/024 123/432 |

(Continued)

*Primary Examiner* — Brandi N Hopkins

(57) ABSTRACT

A method for calculating Atkinson cycle intake flowrate of an internal combustion engine includes determining an intake stopping point and an engine crank angle corresponding to a piston position of the internal combustion engine at the intake stopping point; calculating mass and partial pressure of an exhaust gas and a fresh gas within a cylinder from the engine crank angle; obtaining a mass ratio of a quantity of gas pushed out of the cylinder by a piston to a total quantity of gas within the cylinder at the intake stopping point during a period of time starting from the intake stopping point until intake valve closure; and calculating intake flowrate of the fresh gas within the cylinder at the intake valve closure from the mass ratio obtained. Also disclosed is a system for calculating Atkinson cycle intake flowrate of an internal combustion engine.

10 Claims, 3 Drawing Sheets

(51) Int. Cl.
*F02D 13/02* (2006.01)
*F02D 41/00* (2006.01)

(52) U.S. Cl.
CPC ............ *F02D 41/18* (2013.01); *F02D 41/009* (2013.01); *F02D 2041/001* (2013.01); *F02D 2200/0402* (2013.01); *F02D 2200/0406* (2013.01); *Y02T 10/142* (2013.01); *Y02T 10/6295* (2013.01)

(58) Field of Classification Search
CPC ........... F02D 2200/0406; F02D 35/023; F02D 41/18; F02D 41/009; F02D 41/0087; F02D 41/222; F02D 41/3035; Y02T 10/6295; Y02T 10/142; G01M 15/106
See application file for complete search history.

(56) References Cited

U.S. PATENT DOCUMENTS

2004/0065303 A1\* 4/2004 Russell ............... F02D 41/0072
 123/480
2013/0245967 A1\* 9/2013 Hagari ................... F02D 41/18
 702/45

\* cited by examiner

METHOD AND SYSTEM FOR CALCULATING ATKINSON CYCLE INTAKE FLOWRATE OF INTERNAL COMBUSTION ENGINE

FIELD OF THE INVENTION

The present invention relates to the field of internal combustion engines, and in particular, to a method and a system for calculating Atkinson cycle intake flowrate of an internal combustion engine.

BACKGROUND OF THE INVENTION

In 1882, on the basis of an Otto cycle internal combustion engine, British engineer James Atkinson designed a complicated linkage mechanism, which allowed for a longer expansion stroke compared to the compression stroke. This clever design not only improves the intake efficiency of the engine, but also led to a higher expansion ratio compared to the compression ratio, which effectively improves engine efficiency; the working principle of such an engine is referred to as the Atkinson cycle. However, with the Atkinson cycle, the intake flowrate of the cylinder is small and the torque performance is poor when the engine is at low speeds, whereas long piston strokes are not conducive to a high-speed operation of the engine. The Atkinson cycle can effectively exert its power only at intermediate speeds. Therefore, in the past, when dynamic performance was pursued, researches on Atkinson cycle engines were ignored.

In recent years, the development of automotive hybrid power technology has brought the Atkinson cycle back to attention. The wheels of a hybrid vehicle are powered by an electric motor at either low or high speeds, and the engine is generating electricity most of the time; therefore, the engine can run at a speed that allows the most economical fuel consumption. This is exactly where the advantage of high thermal efficiency of the Atkinson cycle can be fully exploited. Therefore, under the pressure of fuel consumption regulations, domestic and overseas automobile companies began to study the Atkinson cycle. It can be said that the Atkinson cycle is one of the key technologies of hybrid vehicles.

The calculation of intake flowrate is a key issue in Atkinson cycle control. This is because in engine control, the adjustment of parameters, including engine output torque, fuel injection amount, ignition angle, and throttle opening, is based on accurate calculation of the intake flowrate. At present, there are two main methods for calculating the intake flowrate of an internal combustion engine in real vehicles: one method is based on an air intake mass flow sensor: the amount of fresh gas entered into the engine cylinder is calculated from mass flow signals detected by the air intake mass flow sensor. However, under some working conditions of the Atkinson cycle, high-intensity backflow occurs, leading to mass flow signal deviation that results in inaccurate calculations. The other method is based on an intake pressure sensor: in a conventional engine, intake valve closure occurs when the piston is near the intake bottom dead center; at this point, the pressure within the cylinder is approximately equal to the intake pressure. The state within the cylinder at intake valve closure can be therefore obtained, and the quantity of fresh gas entering the cylinder can be calculated. However, in an Atkinson cycle, the position of the piston at intake valve closure is far from the position of the piston at the intake bottom dead center, and the pressure within the cylinder is considerably different from the intake pressure. Therefore, this method is not applicable to an Atkinson cycle machine.

SUMMARY OF THE INVENTION

In view of the above, a method and a system for calculating Atkinson cycle intake flowrate of an internal combustion engine are provided according to the present invention; the method and the system allows automatic and accurate calculation of the intake flowrate of an Atkinson cycle.

A method for calculating Atkinson cycle intake flowrate of an internal combustion engine is provided according to an embodiment of the present invention. The method includes determining an intake stopping point and an engine crank angle corresponding to a piston position of the internal combustion engine at the intake stopping point; calculating mass and partial pressure of an exhaust gas as well as mass and partial pressure of a fresh gas within a cylinder from the engine crank angle when the piston position of the internal combustion engine is at the intake stopping point; obtaining a mass ratio of a quantity of gas pushed out of the cylinder by a piston to a total quantity of gas within the cylinder at the intake stopping point during a period of time starting from the intake stopping point until intake valve closure (IVC) according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained.

A system for calculating Atkinson cycle intake flowrate of an internal combustion engine is provided according to an embodiment of the present invention. The system comprises an intake stopping point determination module, which is employed to determine an intake stopping point and an engine crank angle corresponding to a piston position of the internal combustion engine at the intake stopping point; a mass and partial pressure determination module, which is employed to calculate mass and partial pressure of an exhaust gas as well as mass and partial pressure of a fresh gas within a cylinder from the engine crank angle when the piston position of the internal combustion engine is at the intake stopping point; a mass ratio determination module, which is employed to obtain a mass ratio of a quantity of gas pushed out of the cylinder by a piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and an intake flowrate acquisition module, which is employed to calculate intake flowrate of the fresh gas within the cylinder at the intake valve closure from the mass ratio obtained.

The technical solutions provided by the embodiments of the present invention have the following beneficial effects:

In summary, the present invention involves determining an intake stopping point and an engine crank angle corresponding to a piston position of the internal combustion engine at the intake stopping point; calculating mass and partial pressure of an exhaust gas as well as mass and partial pressure of a fresh gas within a cylinder from the engine crank angle when the piston position of the internal combustion engine is at the intake stopping point; obtaining a mass ratio of a quantity of gas pushed out of the cylinder by a piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained. The method for calculating Atkinson cycle intake flowrate using the intake stopping point from the present invention allows accurate calculation of the Atkinson cycle intake flowrate using only conventional sensors in existing engines; additional sensors are not involved. It has wide application potential. In addition, since the intake flowrate of the engine operating on the Atkinson cycle is accurately calculated, it is possible accurate control the torque, the fuel injection amount, the ignition angle, and other parameters, thereby improving engine performances in various aspects including power, oil consumption, and emission. Furthermore, the method is based on engine intake pressure sensors that are widely used, and therefore can be applied in existing real vehicle environments.

The above description is only a summary of the technical solutions of the present invention. Preferred embodiments and accompanying drawings are provided hereafter and described in detail in order to more clearly demonstrate the technical means of the present invention to allow implementation according to the contents of the specification, and to make the objectives, features and advantages of the present invention more comprehensible.

PREFERRED EMBODIMENTS OF THE INVENTION

To further explain the technical solutions adopted by the present invention to achieve the objectives of the present invention and the technical effects of the present invention, the method and system for calculating Atkinson cycle intake flowrate of an internal combustion engine according to the present invention and their specific embodiments, structures, features and effects are described in detail hereinafter with reference to the accompanying drawings and preferred embodiments.

The aforementioned and other technical contents, features, and effects of the present invention will be clearly demonstrated by detailed descriptions of the preferred embodiments with reference to the drawings. Through the description of the specific embodiments, the technical solutions adopted by the present invention for achieving the intended objectives, and the technical effects of the present invention may be understood more deeply and more specifically. However, the drawings provided are only for reference and illustration purposes, and are not meant to limit the scope of the present invention.

The First Embodiment

Figure 1:
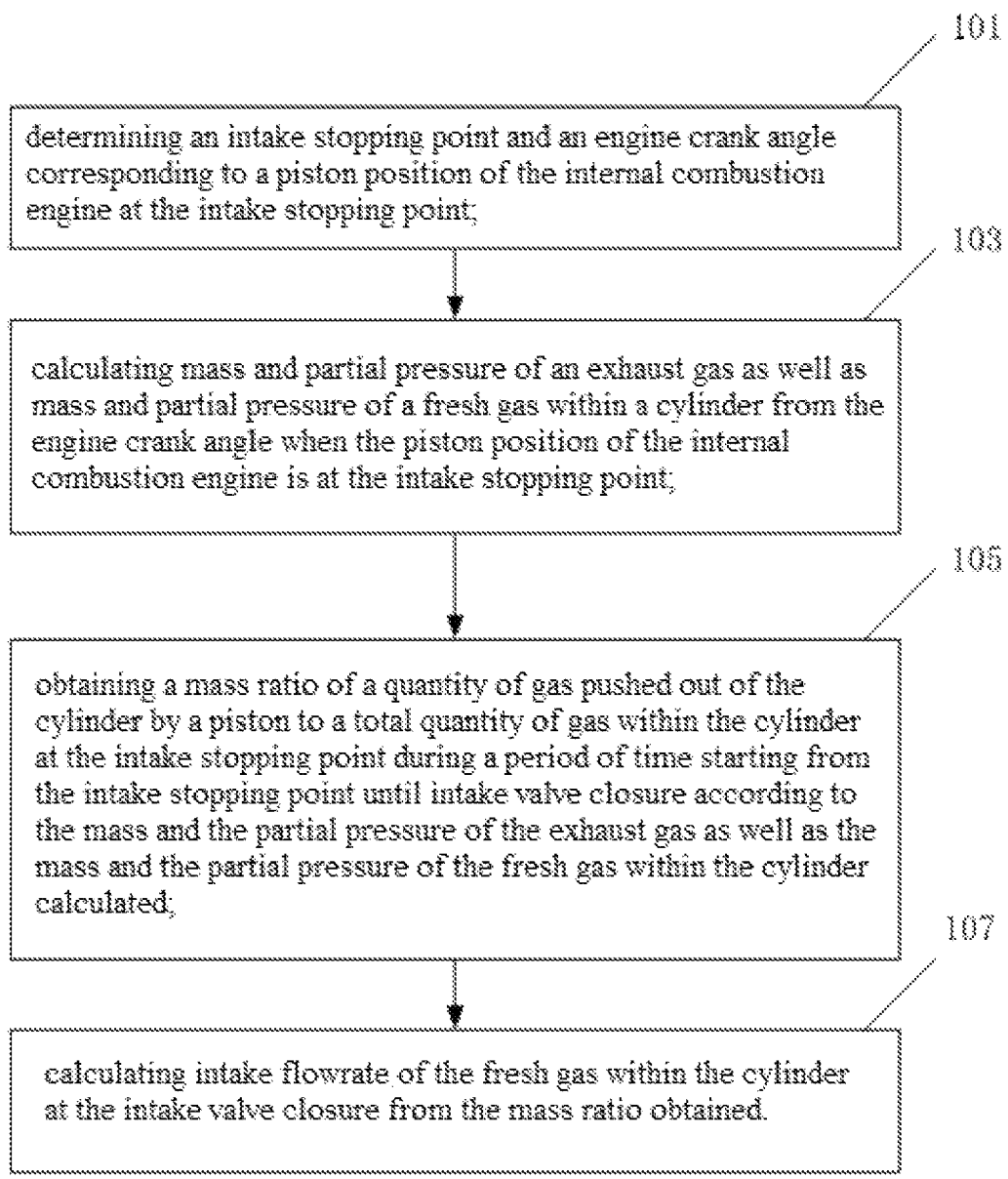
FIG. 1 is a flowchart showing steps of a method for calculating Atkinson cycle intake flowrate of an internal combustion engine according to the first embodiment of the present invention.
Figure 2:
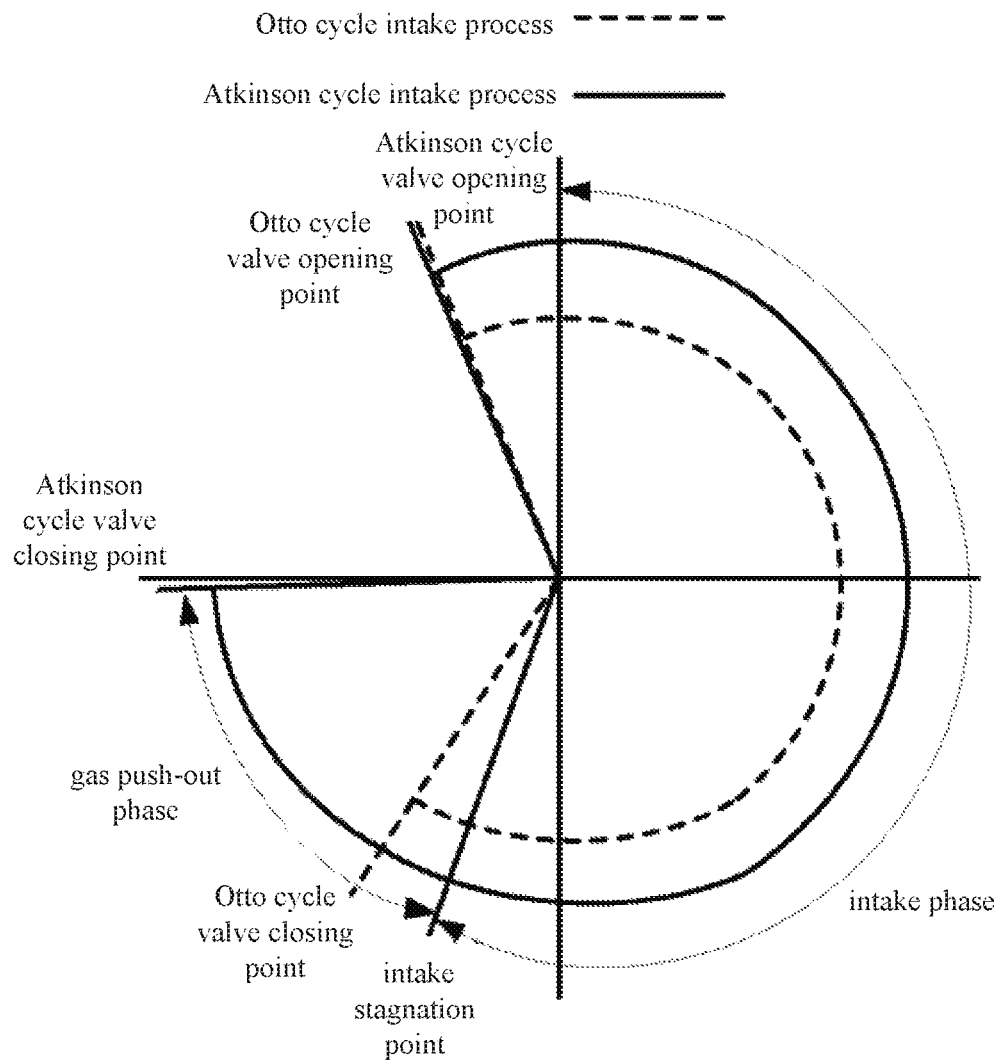
FIG. 2 is a schematic diagram showing the intake process of an Otto cycle and the intake process of an Atkinson cycle.

FIG. 1 is a flowchart showing steps of a method for calculating Atkinson cycle intake flowrate of an internal combustion engine according to the first embodiment of the present invention. FIG. 2 is a schematic diagram showing the intake process of an Otto cycle and the intake process of an Atkinson cycle. The Atkinson cycle intake air volume can be automatically and accurately determined through the method for calculating the intake flowrate of an Atkinson cycle internal combustion engine according to the embodiment of the present invention. Referring to FIGS. 1 and 2, the method for calculating the intake flowrate of an Atkinson cycle internal combustion engine according to this embodiment includes the following steps 101 to 107.

Step 101: determining an intake stopping point and an engine crank angle corresponding to a piston position of the internal combustion engine at the intake stopping point.

Generally, conventional internal combustion engines are mostly four-stroke internal combustion engines, and the four strokes are an intake stroke, a compression stroke, a power stroke and an exhaust stroke. The process of a piston moving from one end of a cylinder to the other end when reciprocating within the cylinder is referred to as a stroke. The combustion chamber of the cylinder can be filled with fresh air through an intake valve, and gas can be exhausted through an exhaust valve. The intake valve is arranged such that the opening and closing of an intake port depend on the position of the intake valve, and the exhaust valve is arranged such that the opening and closing of an exhaust port depend on the position of the exhaust valve. When the internal combustion engine is in operation, airflow flows from an intake pipe to the cylinder combustion chamber through the intake port, and flows out of the cylinder combustion chamber through the exhaust port. A throttle is provided in the intake pipe of the internal combustion engine to control the airflow flowing into the intake pipe. Specifically, in operation, the internal combustion engine introduces fresh gas into the cylinder via the intake stroke of the internal combustion engine. Compared with a conventional internal combustion engine cycle, the Atkinson cycle has an additional gas push-out process after the intake stroke, as shown in FIG. 2. That is, in the Atkinson cycle, after the gas enters the cylinder, some of the gas is pushed back out. From the moment the gas enters the cylinder to the moment the gas is pushed back out, there must be an instant at which the in-cylinder pressure is equal to the pressure in the intake channel, and thus the instantaneous gas flow through the intake valve is zero. The engine crank angle at this moment corresponds to the piston position at an intake stopping point. To determine the intake stopping point is essentially to determine the moment at which the in-cylinder pressure is equal to the intake pressure in the Atkinson cycle, and the intake pressure and the in-cylinder pressure can be measured by a sensor, so that the state within the cylinder at this moment is known.

Specifically, methods for determining the intake stopping point include, but are not limited to, the following three.

The first method is a Computational Fluid Dynamics (CFD) simulation method, which includes pre-establishing a CFD model of an intake process of the engine, simulating gas flow in the intake process of the cylinder according to the CFD model (i.e., in the CFD model), establishing a corresponding relationship between the intake stopping point and in-cylinder pressure of the engine, and correcting the corresponding relationship using an actually collected in-cylinder pressure signal to obtain the intake stopping point. The CFD model is an existing model.

The second method is an engine one-dimensional simulation method, which includes pre-establishing a one-dimensional simulation model of an engine according to physical parameters of the engine and data including in-cylinder pressure of the engine, the physical parameters mainly include intake pressure, intake temperature, throttle opening, exhaust pressure, exhaust temperature, engine speed, intake valve opening angle, exhaust valve opening/closing angle, etc. (referred to as physical parameters herein); and simulating gas flow in an intake process of the cylinder according to the one-dimensional simulation model (i.e., in the one-dimensional simulation model); establishing a corresponding relationship between the intake stopping point and the in-cylinder pressure of the engine; and correcting the corresponding relationship using an actually collected in-cylinder pressure signal to obtain the intake stopping point. The one-dimensional simulation model could also be an existing model, and the physical parameters above can all be measured by sensors. For example, the intake temperature can be measured by a temperature sensor installed in the intake pipe.

The third method is an engine bench test method, which includes measuring intake port pressure and in-cylinder pressure by a transient intake pressure sensor and an engine in-cylinder pressure sensor respectively, and determining the intake stopping point by comparing changes of intake port pressure value and in-cylinder pressure value after filtering the intake port pressure and the in-cylinder pressure.

Preferably, step 101 may further include: determining a map which takes rotating speed and load of the engine as inputs and a theoretical crank angle of the engine corresponding to the intake stopping point as an output after determining the intake stopping point by the three methods above; and obtaining the engine crank angle corresponding to the intake stopping point in the current Atkinson cycle by inquiring the aforementioned map with actual rotational speed and actual intake pressure of the engine when the engine is running, plus correcting using an actual intake temperature and actual throttle opening. Specifically, the formula for calculating the engine crank angle is:

$\theta = F_\theta(N_{engine}, P_{intake}) + \Delta(T_{intake}) + \Delta(X_{throttle})$, where $\theta$ is the engine crank angle corresponding to the intake stopping point of the Atkinson cycle, $N_{engine}$ is the engine speed, $P_{intake}$ is the intake pressure, $T_{intake}$ is the intake temperature, $X_{throttle}$ is the throttle opening, and $F_\theta(N_{engine}, P_{intake})$ is an existing function of $T_{intake}$ and $X_{throttle}$.

Step 103: calculating mass and partial pressure of an exhaust gas as well as mass and partial pressure of a fresh gas within a cylinder from the engine crank angle when the piston position of the internal combustion engine is at the intake stopping point.

The step specifically includes calculating the mass and partial pressure of the exhaust gas as well as the mass and partial pressure of the fresh gas within the cylinder when the internal combustion engine piston position is at the intake stopping point from physical parameters measured by sensors of the engine, in combination with the engine crank angle corresponding to the intake stopping point calculated in step 101; the physical parameters mainly include intake pressure, intake temperature, throttle opening, exhaust pressure, exhaust temperature, engine speed, intake valve opening angle, exhaust valve opening/closing angle, etc. (referred to as physical parameters herein).

In this step, the amount of exhaust gas at the intake stopping point may be calculated from the physical parameters of the engine using the ideal gas law. The exhaust gas temperature at the intake stopping point can be calculated using the ideal gas law and the energy conservation principle. The partial pressure of the exhaust gas at the intake stopping point may be calculated using the ideal gas law. The partial pressure of the fresh gas at the intake stopping point may be calculated using the ideal gas law. The temperature of the fresh gas at the intake stopping point may be calculated using the heat exchange equation. The mass of the fresh gas at the intake stopping point may be calculated using the ideal gas law. The equations, formulas and methods involved in this step are all conventional methods in this field, and are not discussed in further detail.

Step 105: obtaining a mass ratio of a quantity of gas pushed out of the cylinder by the piston to a total quantity of gas (including the exhaust gas and the fresh gas) within the cylinder at the intake stopping point during a period of time starting from the intake stopping point until intake valve closure according to the mass and the partial pressure of the exhaust gas as well as the mass and the partial pressure of the fresh gas within the cylinder calculated.

In this step, the total quantity of gas within the cylinder at the intake stopping point may be obtained from the mass of the exhaust gas and the mass of the fresh gas at the intake stopping point calculated in step 103. Then, the mass ratio of the quantity of gas pushed out of the cylinder into a intake manifold to the total amount of gas within the cylinder at the intake stopping point (referred to as an actual gas push-out ratio) during the period of time starting from the intake stopping point until the intake valve closure is calculated from physical parameters of the engine.

Specifically, the method for calculating the actual gas push-out ratio is as follows: performing experimental calibration on the push-out ratio in the Atkinson working condition range of the engine according to real-time physical parameters of the engine and the intake flow rate measured; determining a map which takes the engine speed and the intake valve closing angle as inputs and a basic push-out ratio as an output; then, obtaining the basic push-out ratio under the current working conditions by inquiring the aforementioned map with the engine speed and the intake valve closing angle; and obtaining the actual gas push-out ratio by correcting the basic push-out ratio using the intake temperature, the valve overlapping angle and the valve opening.

As mentioned above, the total quantity of gas within the cylinder at the intake stopping point $m_{total}$ is calculated from the mass of the exhaust gas $m_{residual}$ and the mass of the fresh gas $m_{fresh}$ within the cylinder at the intake stopping point calculated. The actual gas push-out ratio is calculated from physical parameters including the engine speed $N_{engine}$, the intake valve closing angle $\theta_{intakeclose}$, the intake temperature $T_{intake}$, the valve overlapping angle $\theta_{overlap}$ and the throttle opening $X_{throttle}$. The respective formulas are $m_{total} = m_{residual} + m_{fresh}$, $\alpha = F\alpha(N_{engine}, \theta_{intakeclose}) * K_1 (T_{intake}) * K_2(\theta_{overlap}) * K_3(X_{throttle})$, where $m_{residual}$ is the mass of the exhaust gas within the cylinder at the intake stopping point, $m_{fresh}$ is the mass of the fresh gas within the cylinder at the intake stopping point, $m_{total}$ is the total quantity of gas within the cylinder at the intake stopping point, $N_{engine}$ is the engine speed, $\theta_{intakeclose}$ is the intake valve closing angle, $T_{intake}$ is the intake temperature, $\theta_{overlap}$ is the valve overlapping angle, and $X_{throttle}$ is the throttle opening.

Step 107: calculating intake flowrate of the fresh gas within the cylinder at the intake valve closure from the mass ratio obtained.

This step may further include calculating mass of the exhaust gas and mass of the fresh gas within the cylinder at the intake valve closure from the actual gas push-out ratio calculated in step 105 as well as the mass of the exhaust gas and the mass of the fresh gas within the cylinder of the engine at the intake stopping point calculated in step 103. The mass of the fresh gas within the cylinder at the intake valve closure is the Atkinson cycle intake flowrate. Formulas for calculating the mass of the exhaust gas and the mass of the fresh gas within the cylinder at the intake valve closure are $m_{residual\ Ivc}=(1-\alpha)*m_{residual}$ and $m_{fresh\ Ivc}=(1-\alpha)*m_{fresh}$ respectively, where $\alpha$ is the mass ratio; $m_{residual}$ and $m_{fresh}$ are the mass of the exhaust gas and the mass of the fresh gas within the cylinder at the intake stopping point respectively; $m_{residual\ Ivc}$ and $m_{fresh\ Ivc}$ are the mass of the exhaust gas and the mass of the fresh gas within the cylinder at the intake valve closure respectively. In summary, the present invention involves determining an intake stopping point and an engine crank angle corresponding to a piston position of the internal combustion engine at the intake stopping point; calculating mass and partial pressure of an exhaust gas as well as mass and partial pressure of a fresh gas within a cylinder from the engine crank angle when the piston position of the internal combustion engine is at the intake stopping point; obtaining a mass ratio of a quantity of gas pushed out of the cylinder by the piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained. The method for calculating Atkinson cycle intake flowrate from the intake stopping point according to the present invention allows accurate calculation of the Atkinson cycle intake flowrate using only conventional sensors in existing engines; no additional sensors are involved. It has wide application potential. In addition, since the intake flowrate of the engine operating on the Atkinson cycle is accurately calculated, it is possible to accurately control the torque, the fuel injection amount, the ignition angle, and other parameters, thereby improving engine performances in various aspects including power, oil consumption, and emission, among others. Furthermore, the method is based on engine intake pressure sensors that are widely used, and therefore can be applied in existing real vehicle environments.

A device embodiment according to the present invention is described hereinafter. For details which are not described in this device embodiment, reference may be made to the corresponding method embodiment above.

The Second Embodiment

Figure 3:
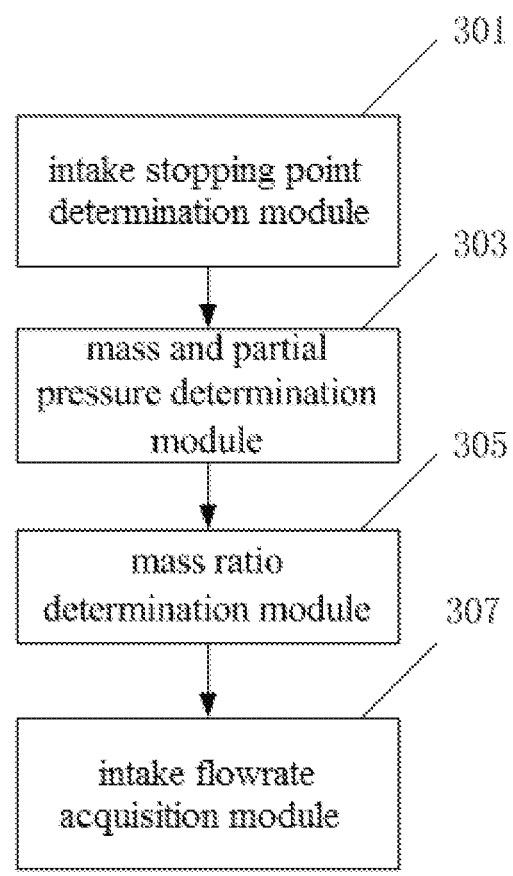
FIG. 3 is a block diagram showing the main components of a system for calculating Atkinson cycle intake flowrate of an internal combustion engine according to the second embodiment of the present invention.

FIG. 3 is a block diagram showing the main components of a system for calculating Atkinson cycle intake flowrate of an internal combustion engine according to the second embodiment of the present invention. Referring to FIG. 3, the system for calculating Atkinson cycle intake flowrate of the internal combustion engine comprises an intake stopping point determination module 301, a mass and partial pressure determination module 303, a mass ratio determination module 305, and an intake flowrate acquisition module 307.

Specifically, the intake stopping point determination module 301 is employed to determine an intake stopping point and an engine crank angle corresponding to a piston position of the internal combustion engine at the intake stopping point.

The mass and partial pressure determination module 303 is employed to calculate mass and partial pressure of an exhaust gas as well as mass and partial pressure of a fresh gas within a cylinder from the engine crank angle when the piston position of the internal combustion engine is at the intake stopping point.

The mass ratio determination module 305 is employed to obtain a mass ratio of a quantity of gas pushed out of the cylinder by the piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated.

The intake flowrate acquisition module 307 is employed to calculate intake flowrate of the fresh gas within the cylinder at the intake valve closure from the mass ratio obtained.

Preferably, the intake stopping point determination module 301 is further employed to pre-establish a CFD model of an intake process of the engine, simulate gas flow in the intake process of the cylinder according to the CFD model, establish a corresponding relationship between the intake stopping point and in-cylinder pressure, and correct the corresponding relationship using an actually collected in-cylinder pressure signal to obtain the intake stopping point; or to pre-establish a one-dimensional simulation model of an engine according to physical parameters of the engine and in-cylinder pressure of the engine, simulate gas flow in an intake process of the cylinder according to the one-dimensional simulation model, establish a corresponding relationship between the intake stopping point and the in-cylinder pressure of the engine, and correct the corresponding relationship using an actually collected in-cylinder pressure signal to obtain the intake stopping point; or to measure intake port pressure and in-cylinder pressure by a transient intake pressure sensor and an engine in-cylinder pressure sensor respectively, and determine the intake stopping point by comparing changes of both intake port pressure value and in-cylinder pressure value after filtering the intake port pressure and the in-cylinder pressure.

Preferably, the intake stopping point determination model 301 is further employed to determine a map which takes rotational speed and load of an engine as inputs and a theoretical crank angle of the engine corresponding to the intake stopping point as an output after the intake stopping point is determined; and obtain the engine crank angle corresponding to the intake stopping point in an Atkinson cycle by inquiring the map with actual rotational speed and actual intake pressure of the engine when the engine is running, plus correct using an actual intake temperature and actual throttle opening.

Preferably, the mass ratio determination module 305 is further employed to calculate the total quantity of gas within the cylinder at the intake stopping point from the mass of the exhaust gas and mass of the fresh gas within the cylinder at the intake stopping point calculated, and then obtain the mass ratio of the quantity of gas pushed out of the cylinder to the total quantity of gas within the cylinder at the intake stopping point during the period of time starting from the intake stopping point until the intake valve closure according to the physical parameters of the engine. Specifically, the mass ratio is an actual gas push-out ratio.

Preferably, the intake flowrate acquisition module 307 is further employed to calculate mass of the exhaust gas and mass of the fresh gas within the cylinder at the intake valve closure from the mass ratio obtained as well as the mass of the exhaust gas and the mass of the fresh gas within the cylinder of an engine at the intake stopping point calculated, wherein the mass of the fresh gas within the cylinder at the intake valve closure is the Atkinson cycle intake flowrate; formulas for calculating the mass of the exhaust gas and the mass of the fresh gas within the cylinder at the intake valve closure are $m_{residual\ Ivc}=(1-\alpha)*m_{residual}$ and $m_{fresh\ Ivc}=(1-\alpha)*m_{fresh}$ respectively, where $\alpha$ is the mass ratio, $m_{residual}$ and $m_{fresh}$ are the mass of the exhaust gas and the mass of the fresh gas within the cylinder at the intake stopping point respectively, $m_{residual\ Ivc}$ and $m_{fresh\ Ivc}$ are the mass of the exhaust gas and the mass of the fresh gas within the cylinder at the intake valve closure respectively.

In summary, the present invention involves determining an intake stopping point and an engine crank angle corresponding to a piston position of the internal combustion engine at the intake stopping point; calculating mass and partial pressure of an exhaust gas as well as mass and partial pressure of a fresh gas within a cylinder from the engine crank angle when the piston position of the internal combustion engine is at the intake stopping point; obtaining a mass ratio of a quantity of gas pushed out of the cylinder by the piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained. The method for calculating Atkinson cycle intake flowrate using the intake stopping point according to the present invention allows accurate calculation of the Atkinson cycle intake flowrate using only conventional sensors in existing engines; no additional sensors are involved. It has wide application potential. In addition, since the intake flowrate of the engine operating on the Atkinson cycle is accurately calculated, it is possible to accurately control the torque, the fuel injection amount, the ignition angle, and other parameters, thereby improving engine performances in various aspects including power, oil consumption, and emission, among others. Furthermore, the method is based on engine intake pressure sensors that are widely used, and therefore can be applied in existing real vehicle environments.

The embodiments described above are only preferred embodiments of the present invention. They do not limit the scope of the present invention in any form. Although the present invention has been disclosed in the preferred embodiments, those preferred embodiments are not intended to limit the scope of present invention. Any person skilled in the art may make some variations or modifications to the technical contents disclosed above to obtain equivalent embodiments of equivalent variations by using the above-disclosed technical contents without departing from the technical scope of the present invention. Any simple modifications, equivalent variations and modifications made to the above embodiments according to the spirit of the present invention without departing from the contents of the technical solution of the present invention should be deemed as still within the scope of the technical solution of the present invention.

INDUSTRIAL APPLICABILITY

The method and system for calculating Atkinson cycle intake flowrate of an internal combustion engine of the present invention involves determining an intake stopping point and an engine crank angle corresponding to a piston position of the internal combustion engine at the intake stopping point; calculating mass and partial pressure of an exhaust gas as well as mass and partial pressure of a fresh gas within a cylinder from the engine crank angle when the piston position of the internal combustion engine is at the intake stopping point; obtaining a mass ratio of a quantity of gas pushed out of the cylinder by the piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained. The method for calculating Atkinson cycle intake flowrate using the intake stopping point according to the present invention allows accurate calculation of the Atkinson cycle intake flowrate using only conventional sensors in existing engines; no additional sensors are involved. It has wide application potential. In addition, since the intake flowrate of the engine operating on the Atkinson cycle is accurately calculated, it is possible to accurately control of the torque, the fuel injection amount, the ignition angle, and other parameters, thereby improving engine performances in various aspects including power, oil consumption, and emission, among others. Furthermore, the method is based on engine intake pressure sensors that are widely used, and therefore can be applied in existing real vehicle environments.

What is claimed is:

1. A method for calculating Atkinson cycle intake flowrate of an internal combustion engine, characterized in that the method for calculating Atkinson cycle intake flowrate of an internal combustion engine comprises:

determining an intake stopping point and an engine crank angle corresponding to a piston position of the internal combustion engine at the intake stopping point;

calculating mass and partial pressure of an exhaust gas as well as mass and partial pressure of a fresh gas within a cylinder from the engine crank angle when the piston position of the internal combustion engine is at the intake stopping point;

obtaining a mass ratio of a quantity of gas pushed out of the cylinder by a piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and calculating intake flowrate of the fresh gas within the cylinder at the intake valve closure from the mass ratio obtained.

2. The method for calculating Atkinson cycle intake flowrate of the internal combustion engine according to claim 1, characterized in that determining the intake stopping point comprises:

pre-establishing a CFD model of an intake process of an engine, simulating gas flow in the intake process of the cylinder according to the CFD model, establishing a corresponding relationship between the intake stopping point and in-cylinder pressure of the engine, and correcting the corresponding relationship using an actually collected in-cylinder pressure signal to obtain the intake stopping point; or pre-establishing a one-dimensional simulation model of an engine according to physical parameters of the engine and in-cylinder pressure of the engine, simulating gas flow in an intake process of the cylinder according to the one-dimensional simulation model, establishing a corresponding relationship between the intake stopping point and the in-cylinder pressure of the engine, and correcting the corresponding relationship using an actually collected in-cylinder pressure signal to obtain the intake stopping point; or measuring intake port pressure and in-cylinder pressure by a transient intake pressure sensor and an engine in-cylinder pressure sensor respectively, and determining the intake stopping point by comparing changes of intake port pressure value and in-cylinder pressure value after filtering the intake port pressure and the in-cylinder pressure.

3. The method for calculating Atkinson cycle intake flowrate of the internal combustion engine according to claim 1, characterized in that determining the intake stopping point and the engine crank angle corresponding to the piston position of the internal combustion engine at the intake stopping point further comprises: determining a map which takes rotational speed and load of an engine as inputs and a theoretical crank angle of the engine corresponding to the intake stopping point as an output after the intake stopping point is determined; and obtaining the engine crank angle corresponding to the intake stopping point in an Atkinson cycle by inquiring the map with actual rotational speed and actual intake pressure of the engine when the engine is running, plus correcting using an actual intake temperature and actual throttle opening.

4. The method for calculating Atkinson cycle intake flowrate of the internal combustion engine according to claim 1, characterized in that obtaining the mass ratio of the quantity of gas pushed out of the cylinder by the piston to the total quantity of gas within the cylinder at the intake stopping point during the period of time starting from the intake stopping point until the intake valve closure according to the mass and the partial pressure of the exhaust gas as well as the mass and the partial pressure of the fresh gas within the cylinder calculated further comprises:

calculating the total quantity of gas within the cylinder at the intake stopping point from the mass of the exhaust gas and the mass of the fresh gas within the cylinder at the intake stopping point calculated, and then obtaining the mass ratio of the quantity of gas pushed out of the cylinder to the total quantity of gas within the cylinder at the intake stopping point during the period of time starting from the intake stopping point until the intake valve closure according to physical parameters of an engine, wherein the mass ratio is an actual gas push-out ratio.

5. The method for calculating Atkinson cycle intake flowrate of the internal combustion engine according to claim 1, characterized in that calculating the intake flowrate of the fresh gas within the cylinder at the intake valve closure from the mass ratio obtained comprises:

calculating mass of the exhaust gas and mass of the fresh gas within the cylinder when the intake valve is closed from the mass ratio obtained as well as the mass of the exhaust gas and the mass of the fresh gas within the cylinder of an engine at the intake stopping point calculated, wherein the mass of the fresh gas within the cylinder at the intake valve closure is the Atkinson cycle intake flowrate; formulas for calculating the mass of the exhaust gas and the mass of the fresh gas within the cylinder at the intake valve closure are $m_{residual\ Ivc}=(1-\alpha)*m_{residual}$ and $m_{fresh\ Ivc}=(1-\alpha)*m_{fresh}$ respectively, where a is the mass ratio, $m_{residual}$ and $m_{fresh}$ are the mass of the exhaust gas and the mass of the fresh gas within the cylinder at the intake stopping point respectively, $m_{residual\ Ivc}$ and $m_{fresh\ Ivc}$ are the mass of the exhaust gas and the mass of the fresh gas within the cylinder at the intake valve closure respectively.

6. A system for calculating Atkinson cycle intake flowrate of an internal combustion engine, characterized in that it comprises:

an intake stopping point determination module, which is employed to determine an intake stopping point and an engine crank angle corresponding to a piston position of the internal combustion engine at the intake stopping point;

a mass and partial pressure determination module, which is employed to calculate mass and partial pressure of an exhaust gas as well as mass and partial pressure of a fresh gas within a cylinder from the engine crank angle when the piston position of the internal combustion engine is at the intake stopping point;

a mass ratio determination module, which is employed to obtain a mass ratio of a quantity of gas pushed out of the cylinder by a piston to a total quantity of gas within the cylinder at the intake stopping point during a period of time starting from the intake stopping point until intake valve closure according to the mass and the partial pressure of the exhaust gas as well as the mass and the partial pressure of the fresh gas within the cylinder calculated; and an intake flowrate acquisition module, which is employed to calculate intake flowrate of the fresh gas within the cylinder at the intake valve closure from the mass ratio obtained.

7. The system for calculating Atkinson cycle intake amount of the internal combustion engine according to claim 6, characterized in that the intake stopping point determination module is further employed to pre-establish a CFD model of an intake process of an engine, simulate gas flow in the intake process of the cylinder according to the CFD model, establish a corresponding relationship between the intake stopping point and in-cylinder pressure, and correct the corresponding relationship using an actually collected in-cylinder pressure signal to obtain the intake stopping point; or to pre-establish a one-dimensional simulation model of an engine according to physical parameters of the engine and in-cylinder pressure of the engine, simulate gas flow in an intake process of the cylinder according to the one-dimensional simulation model, establish a corresponding relationship between the intake stopping point and the in-cylinder pressure of the engine, and correct the corresponding relationship using an actually collected in-cylinder pressure signal to obtain the intake stopping point; or to measure intake port pressure and in-cylinder pressure by a transient intake pressure sensor and an engine in-cylinder pressure sensor respectively, and determine the intake stopping point by comparing changes of both intake port pressure value and in-cylinder pressure value after filtering the intake port pressure and the in-cylinder pressure.

8. The system for calculating Atkinson cycle intake flowrate of the internal combustion engine according to claim 6, wherein the intake stopping point determination module is further employed to determine a map which takes rotational speed and load of an engine as inputs and a theoretical crank angle of the engine corresponding to the intake stopping point as an output after the intake stopping point is determined; and obtain the engine crank angle corresponding to the intake stopping point in an Atkinson cycle by inquiring the map with actual rotational speed and actual intake pressure of the engine when the engine is running, plus correct using an actual intake temperature and actual throttle opening.

9. The system for calculating Atkinson cycle intake flowrate of the internal combustion engine according to claim 6, characterized in that the mass ratio determination module is further employed to calculate the total quantity of gas within the cylinder at the intake stopping point from the mass of the exhaust gas and the mass of the fresh gas within the cylinder at the intake stopping point calculated, and then obtain the mass ratio of the quantity of gas pushed out of the cylinder to the total quantity of gas within the cylinder at the intake stopping point during the period of time starting from the intake stopping point until the intake valve closure according to physical parameters of an engine, wherein the mass ratio is an actual gas push-out ratio.

10. The system for calculating Atkinson cycle intake flowrate of the internal combustion engine according to claim 6, characterized in that the intake flowrate acquisition module is further employed to calculate mass of the exhaust gas and mass of the fresh gas within the cylinder at the intake valve closure from the mass ratio obtained as well as the mass of the exhaust gas and the mass of the fresh gas within the cylinder of an engine at the intake stopping point calculated, wherein the mass of the fresh gas within the cylinder at the intake valve closure is the Atkinson cycle intake flowrate; formulas for calculating the mass of the exhaust gas and the mass of the fresh gas within the cylinder at the intake valve closure are $m_{residual\ Ivc}\ (1-\alpha)*m_{residual}$ and $m_{fresh\ Ivc}=(1-\alpha)*m_{fresh}$ respectively, where a is the mass ratio, $m_{residual}$ and $m_{fresh}$ are the mass of the exhaust gas and the mass of the fresh gas within the cylinder at the intake stopping point respectively, $m_{residual\ Ivc}$ and $m_{fresh\ Ivc}$ are the mass of the exhaust gas and the mass of the fresh gas within the cylinder at the intake valve closure respectively.

* * * * *